United States Patent
Schmidt et al.

(10) Patent No.: US 12,111,455 B2
(45) Date of Patent: Oct. 8, 2024

(54) DETECTING MOVEMENTS OF A SAMPLE WITH RESPECT TO AN OBJECTIVE

(71) Applicant: Abberior Instruments GmbH, Göttingen (DE)

(72) Inventors: Roman Schmidt, Göttingen (DE); Lars Kastrup, Göttingen (DE)

(73) Assignee: Abberior Instruments GmbH, Goettingen (DE)

( * ) Notice: Subject to any disclaimer, the term of this patent is extended or adjusted under 35 U.S.C. 154(b) by 510 days.

(21) Appl. No.: 17/482,752

(22) Filed: Sep. 23, 2021

(65) Prior Publication Data

US 2022/0011559 A1    Jan. 13, 2022

Related U.S. Application Data

(63) Continuation-in-part of application No. PCT/EP2020/059415, filed on Apr. 2, 2020.

(30) Foreign Application Priority Data

Apr. 3, 2019 (DE) ............ 10 2019 108 696.5

(51) Int. Cl.
*G02B 21/00* (2006.01)
*G02B 5/30* (2006.01)
(Continued)

(52) U.S. Cl.
CPC ......... *G02B 21/008* (2013.01); *G02B 5/3083* (2013.01); *G02B 21/0032* (2013.01);
(Continued)

(58) Field of Classification Search
CPC ............ G02B 21/008; G02B 5/3083; G02B 21/0032; G02B 21/02; G02B 21/365;
(Continued)

(56) References Cited

U.S. PATENT DOCUMENTS 7,706,060 B2    4/2010  Mogami
9,370,956 B2    6/2016  Troncoso et al.
(Continued)

FOREIGN PATENT DOCUMENTS

DE         253093 B1    3/1989
DE       10100246 A1    7/2002
(Continued)

OTHER PUBLICATIONS

Garcia-Martinez, P. et al. "On axis programmable microscope using liquid crystal spatial light modulator", Optical Methods for Inspection, Characterization, and Imaging of Biomaterials Illustrated, SPIE vol. 10333, 2017, pp. 1-7.
(Continued)

*Primary Examiner* — Arnel C Lavarias
(74) *Attorney, Agent, or Firm* — Thomas | Horstemeyer, LLP

(57) ABSTRACT

An apparatus for detecting movements of a sample with respect to an objective includes imaging optics which include the objective, which have an image plane and which are configured to image light from at least one reference object that is connected to the sample arranged in front of the objective into reference object images in the image plane. The apparatus further includes a camera which is arranged in the image plane of the imaging optics and which is configured to record the reference object images at consecutive points in time, and an optical device arranged between the objective and the camera in a plane that is Fourier-conjugated with respect to the image plane. The optical device is configured to mask out low spatial frequencies of reference object images which the imaging optics image into the image plane.

53 Claims, 11 Drawing Sheets

(51) Int. Cl.
*G02B 21/02* (2006.01)
*G02B 21/36* (2006.01)
*G02B 27/28* (2006.01)

(52) U.S. Cl.
CPC ............ *G02B 21/02* (2013.01); *G02B 21/365* (2013.01); *G02B 27/283* (2013.01)

(58) Field of Classification Search
CPC .. G02B 27/283; G02B 21/00; G02B 21/0004; G02B 21/002; G02B 21/0052; G02B 21/006; G02B 21/0068; G02B 21/0072; G02B 21/06; G02B 21/36; G02B 21/361; G02B 21/367
USPC ........ 359/385, 362, 363, 368, 369, 386, 434
See application file for complete search history.

(56) References Cited

U.S. PATENT DOCUMENTS

| | | |
|---|---|---|
| 2002/0105723 A1 | 8/2002 | Bewersdorf et al. |
| 2005/0078361 A1 | 4/2005 | Bewersdorf et al. |
| 2005/0141081 A1 | 6/2005 | Olschewski |
| 2011/0002530 A1 | 1/2011 | Zhuang et al. |
| 2011/0122491 A1 | 5/2011 | Wolleschensky |
| 2012/0194903 A1 | 8/2012 | Nishikawa |
| 2013/0027518 A1 | 1/2013 | MacKay et al. |
| 2014/0022373 A1 | 1/2014 | Kanarowski et al. |
| 2014/0038201 A1 | 2/2014 | Zhuang et al. |
| 2014/0063194 A1 | 3/2014 | Zhuang et al. |
| 2014/0085715 A1 | 3/2014 | Popescu |
| 2015/0145980 A1 | 5/2015 | Bryll |
| 2016/0202185 A1 | 7/2016 | Zhuang et al. |
| 2017/0023785 A1 | 1/2017 | Nishikawa |
| 2017/0078549 A1 | 3/2017 | Emtman et al. |
| 2018/0017773 A1 | 1/2018 | Tomosugi |
| 2018/0160099 A1 | 6/2018 | Zhuang et al. |
| 2018/0284025 A1* | 10/2018 | Gozali ............... G02B 21/0076 |
| 2020/0099916 A1 | 3/2020 | Zhuang et al. |

FOREIGN PATENT DOCUMENTS

| | | |
|---|---|---|
| DE | 102007009661 A1 | 3/2008 |
| DE | 102008028490 A1 | 12/2009 |
| DE | 102019219578 A1 | 6/2021 |
| EP | 1548485 A1 | 6/2005 |
| JP | 2005345561 A | 12/2005 |
| JP | 2006071353 A | 3/2006 |
| JP | 2006235089 A | 9/2006 |
| JP | 2008014823 A | 1/2008 |
| JP | 2008197357 A | 8/2008 |
| JP | 2009128431 A | 6/2009 |
| JP | 2019049756 A | 3/2019 |
| WO | 2007034796 A1 | 3/2007 |
| WO | 2009085218 A1 | 7/2009 |
| WO | 2011007768 A1 | 1/2011 |
| WO | 2013016356 A1 | 1/2013 |
| WO | 2014184793 A1 | 11/2014 |
| WO | 2016157345 A1 | 12/2017 |

OTHER PUBLICATIONS

Watanabe, T. et al. "Distinct Modulated Pupil Function System for Real-Time Imaging of Living Cells", PLOS One, www.plosone.org, Sep. 2012, vol. 7, Issue 9, pp. 1-13.
Japanese Search Report dated Dec. 5, 2022 with English Translation.
Japanese Search Report dated Dec. 14, 2023 with English Translation.
European Search Report in related, co-pending EP Application No. 23218636.1, mailed Apr. 25, 2024.
Huang Shih Hao et al.: "Development of a monolithic total internal reflection-based biochip utilizing a microprism array for fluorescence sensing; Development of a monolithic total internal reflection-based biochip utilizing a microprism array", Journal of Micromechanics and Microengineering, Institute of Physics, 2235-2242 (2005).
Guohai Situ, Giancarlo Pedrini, and Wolfgang Osten, "Spiral phase filtering and orientation-selective edge detection/enhancement," J. Opt. Soc. Am. A 26, 1788-1797 (2009).
Severin Fürhapter, Alexander Jesacher, Stefan Bernet, and Monika Ritsch-Marte, "Spiral phase contrast imaging in microscopy," Opt. Express 13, 689-694 (2005).

* cited by examiner

DETECTING MOVEMENTS OF A SAMPLE WITH RESPECT TO AN OBJECTIVE

CROSS REFERENCE TO RELATED APPLICATIONS

This application is a continuation in Part to international application PCT/EP2020/059415 entitled "Method and device for detecting movements of a sample with respect to a lens" filed on Apr. 2, 2020 and claiming priority to German patent application No. 10 2019 108 696.5 entitled "Verfahren und Vorrichtung zum Erfassen von Verlagerungen einer Probe gegenüber einem Objektiv" and filed on Apr. 3, 2019.

FIELD OF THE INVENTION

The invention relates to an apparatus for detecting movements of a sample with respect to an objective.

Particularly in high resolution microscopy in which spatial resolutions beyond the diffraction barrier are achieved, movements of an examined sample with respect to an objective of the respective microscope have a significant effect even if these movements do not exceed the nanometer range. A movement of the sample with respect to the objective taking place between two points in time shifts the positions of objects in the sample, that are determined at these two points in time, with respect to one another. If occurring movements of the sample with respect to the objective are not detected, they cannot be compensated, and the effective spatial resolution in microscopically imaging a structure of interest is determined by the size of these movements.

As the movements of a sample with respect to the objective of a microscope, particularly over long measurement times, may never be avoided completely, and as limiting occurring movements to small values provokes relevant technological effort, there is an interest in detecting occurring movements to be able to consider them, i.e. in particular, to compensate them. However, as far as possible, detecting the movements should not affect the actual use of the objective but should ideally take place in parallel to this actual use.

BACKGROUND OF THE INVENTION

A microscope, particularly a confocal or double-confocal scanning microscope and a method of operating such a microscope in which a reference object is provided at an object slide unit allocated to an object to be examined are known from DE 101 00 246 A1. For calibrating, adjusting and/or setting the microscope, the reference object is detected light-microscopically to detect and compensate changes caused by drift. The reference object may be a textured or structured surface of a glass plate which is part of the object slide. The reference object may also include microscopic objects attached to the object slide unit, like for example beads or nanocrystals, which may be distributed stochastically. The reference object is detected by taking an image or by a scanning process, and, from the detected image data of the reference object, its position and/or orientation with respect to the detected object region are gathered. The drift of the object/of the object slide unit is gathered by means of comparing detected image data of the reference object with previously detected image data. This drift is then compensated by a movement of the object slide unit or by methods of digital image processing. In the known microscope and the known method, the calibration, adjustment and/or setting interrupts the actual use of the microscope, i.e. it is not executable in parallel to the actual use of the microscope.

A method of calculating the drift of a microscope and a corresponding microscope are known from EP 1 548 485 B1. In executing the method, an immobile object is selected, and at a first point in time a first image and at a temporarily consecutive second point in time a second image are taken of an area of interest of the immobile object. The first and the second images are then each subdivided by means of a raster into blocks and then compared block by block for movements. From the comparison, a drift is determined and stored for correcting the drift of the microscope. This procedure may also not be executed during the normal operation of the microscope.

A drift correction in a microscope, in which reference objects arranged at a sample slide are used, is known from WO 2013/016356 A1. With one and the same light source, both the reference objects and an object of interest are illuminated, and photons emitted by the reference objects and the object of interest are registered with one and the same image sensor. The positions of the reference objects are extracted from the images taken with the image sensor and used for correction of the drift of the microscope. Actually, a center of intensity of an associated light intensity distribution on the image sensor can be determined for determining the positions of the reference objects. In practice, it proves to be difficult to find reference objects which can be excited for emission of light in a same way as objects of interest and imaged in a same way using the same image sensors for executing this known method.

Auto focus devices for light microscopes are commercially available, in which an auxiliary laser beam, together with illumination light but laterally shifted towards the boundary of the pupil, is coupled into the objective of the respective light microscope. A reflection of this auxiliary light beam, which is imaged by means of the objective onto a position sensitive detector, occurs at a boundary surface between an immersion medium and a cover slip or between a cover slip and an embedding medium. The position of the reflection on the detector depends on the distance of the boundary surface to the objective such that the position signal of the detector may be used as a measurement signal for a control loop to correct an occurring axial drift of a sample stage by controlling a z-drive of the sample stage or an additional actuator. Principally, these auto focus devices depend on a refraction index step between the immersion medium and the cover slip or between the cover slip and the embedding medium so that the function of the auto focus devices is affected or the auto focus devices completely fail with certain combinations of glass types of the cover slip, immersion medium and embedding medium, as they, for example, occur in using glycerin-objectives. Further, the known auto focus devices only allow for a compensation of axial drift in z-direction, i.e. along the optical axis of the objective but not in the x- and y-directions which are orthogonal thereto.

There still is a need of an apparatus for detecting movements of a sample with respect to an objective, which is usable while using the objective for imaging or otherwise measuring an object of interest, to be able to exactly detect and compensate movements of the sample with respect to the objective at any point in time at which the object of interest is imaged or measured through the objective, without prolonging the measurement periods.

SUMMARY OF THE INVENTION

The present invention relates to an apparatus for detecting movements of a sample with respect to an objective. The apparatus comprises imaging optics which include the objective, which have an image plane and which are configured to image light from at least one reference object that is connected to the sample arranged in front of the objective into reference object images in the image plane. The apparatus further comprises a camera which is arranged in the image plane of the imaging optics and which is configured to record the reference object images at consecutive points in time, and an optical device arranged between the objective and the camera. The optical device is arranged in a plane that is Fourier-conjugated with respect to the image plane, and the optical device is configured to mask out low spatial frequencies of reference object images which the imaging optics image into the image plane.

The invention also relates to a microscope comprising said apparatus, wherein the microscope is a confocal microscope, a STimulated Emission Depletion (STED) microscope, a REversible Saturable Optical Linear (Fluorescence) Transitions (RESOLFT) microscope, or a MINimal emission FLUXes (MINFLUX) microscope, and wherein the compensation device is configured to gather and compensate any movements of the sample with respect to the objective during operation of the microscope.

The invention also relates to a use of said apparatus, wherein the at least one reference object has an edge, across which the intensity of the light from the reference object drops by at least 90%, and whose width in parallel to the image plane is smaller than the wavelength of the light.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components of the drawings are not necessarily to scale, emphasize instead being placed upon clearly illustrating the principles of the present invention. In the drawings, like reference numerals designate corresponding parts throughout the several views.

DETAILED DESCRIPTION

Figure 1:
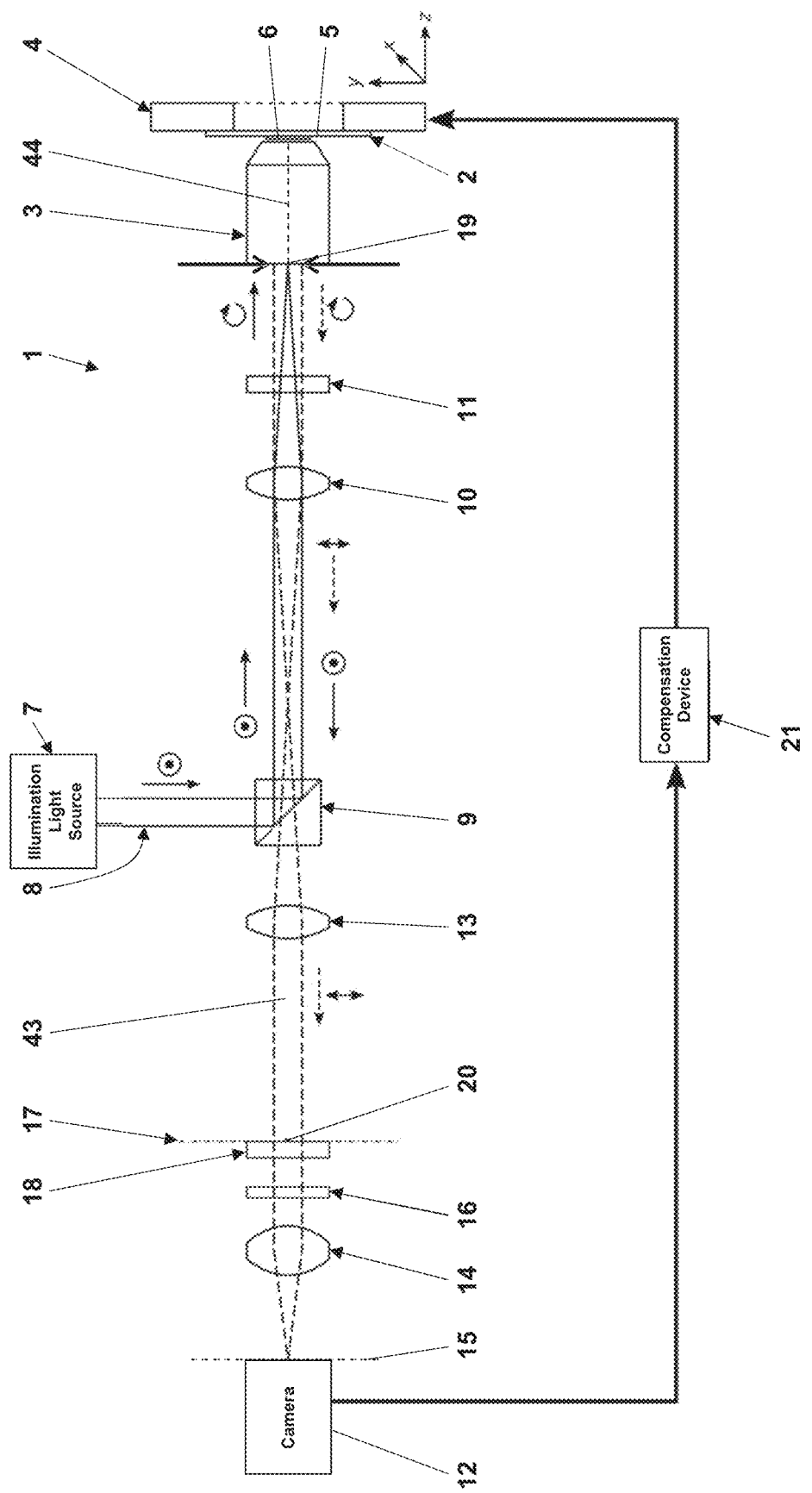
FIG. 1 shows a first embodiment of an apparatus according to the invention for detecting movements of a sample with respect to an objective.

In detecting movements of a sample with respect to an objective, wherein light from at least one reference object connected to the sample is imaged at consecutive points in time by means of the objective into reference object images in an image plane, wherein the reference object images in the image plane are recorded by a camera and wherein the recorded reference object images are compared to one another, low spatial frequencies are masked out of the reference object images in front of the camera in a plane that is Fourier-conjugated with respect to the image plane.

The reference object may be provided in the sample in addition to the object of interest of the sample which is imaged or measured by means of the objective. With a suitable object of interest, the reference object may also be a structure of the object of interest.

This is based on the finding that information on movements between two images of the at least one reference object are only included in such areas of the reference object images which comprise intensity gradients. On the other hand, no information on movements of the images of the at least one reference object is available from areas of the reference object images with homogenous distribution of the intensity. The information on the movement of the images is thus particularly included in as sharp as possible edges of bright reference objects in front of a dark background or vice versa, which result in high gradients of the light intensity in the images.

Thus, low spatial frequencies are masked out of the reference object images in front of the camera in a plane that is Fourier-conjugated with respect to the image plane, or, in other words, in the reference object images, low spatial frequencies are attenuated as compared to high spatial frequencies. In this way, an edge detection filtering is executed which suppresses homogenous areas as compared to areas of the reference object images having high brightness gradients.

In that the masked out low spatial frequencies which would correspond to homogenously bright image areas of the reference object images do not at all get to the camera, they cannot affect the recording of the higher spatial frequencies with the higher content of information on the position of the images by, for example, signal noise increased due to stray light. Further, the dynamic range of the camera may completely be utilized in those areas of the reference object images in which the content of information about the position of the images of the at least one reference object in the reference object images is the highest without, by far and over large areas, exceeding a saturation intensity of the camera.

The edge detection filtering may be effected by masking out parts of the light which originate from a central area of a pupil of the objective in the plane that is Fourier-conjugated with respect to the image plane. Thus, the low spatial frequencies which are located close to the center point of the pupil are suppressed. Here and in the following, the pupil of the objective means its ocular-side pupil which is also designated as exit pupil. The ocular-side pupil is an image of an aperture stop of the objective which appears to the viewer from an axial image point. In objectives of microscopes, the ocular-side pupil in practice coincides with the back focal plane. This applies exactly with objectives for an infinity beam path and at least approximately with objectives for an finite beam path. Thus, the ocular-side pupil is often and also here used as a synonym for the back focal plane of the objective. Further, the ocular-side pupil is close to a plane that is Fourier-conjugated with respect to the object plane of the objective. Thus, in the image plane, there is an amplitude distribution of the electromagnetic field which, in a very good approximation, corresponds to a Fourier-transformation of the amplitude distribution of the electromagnetic field in the pupil. The parts of the light from at least one reference object, which originates from the central area of the pupil of the objective thus belong to the low spatial frequencies to be masked out.

In order to mask out the parts of the light which originate from the central area of the pupil of the objective in the plane that is Fourier-conjugated with respect to the image plane, the pupil of the objective may be imaged into this particular Fourier-plane.

It is preferred to only let high spatial frequencies and thus parts of the light that originate from a border area of the pupil of the objective pass to the camera. It is even more preferred to let these high spatial frequencies or parts from the border area of the pupil pass to the camera as completely as possible. Then, the reference object images include maximum information on the position of the images of the at least one reference object.

Actually, the low spatial frequencies and thus the parts of the light which originate from the central area of the pupil of the objective may be masked out by means of a circular plate covering the central area. Instead of the circular plate, a mirror covering the central area may be used for masking out. This mirror may then deflect the low spatial frequencies towards a further detector to evaluate them, for example, with regard to the brightness of the images of the at least one reference object. If a spatial light modulator (SLM) is used for masking out the low spatial frequencies in front of the camera, the masked out area of the Fourier-conjugated plane may be quickly varied by controlling the SLM in order to optimize it. Further, the SLM may also be controlled to image the reference objects onto the camera in a common way or in images which are complementary with respect to the reference object images.

A circular plate covering the central area of the pupil in the Fourier-conjugated plane may actually be realized by a glass substrate metallized in a circle shape in its center. In the simplest case, the edge detection filtering takes place by means of a thin wire, for example made of metal, which extends in the plane that is Fourier-conjugated with respect to the image plane through the center of the image of the pupil of the objective. This filter filters the spatial frequencies direction dependently but at a direction dependencies decreasing with increasing spatial frequency and in a same way for all images of the at least one reference object. As only variations of the positions of the images are observed, the direction dependency of the filtering is negligible.

Independently on how the low spatial frequencies are masked out in front of the camera, these parts of the light do not get to the camera. Thus, the edge detection filtering is no step of image processing of an image recorded by the camera. Instead, reference object images in which the edge detection filtering already took place directly form on the camera.

It proves to be advantageous, if the at least one reference object has a steep edge across which the intensity of the light originating from the reference object drops by at least 90% and whose width parallel to the image plane is smaller than the wavelength of the light. If then monochromatic light, i.e. light of one wavelength from the at least one reference object is imaged into the reference object images in the image plane, the edge detection filtered reference object images display an diffraction pattern at the edge. Actually, the light intensity distribution shows a first order minimum followed by a first order maximum besides the zeroth order maximum which is strongly reduced in its intensity due to the masked out low spatial frequencies. Both intensity increases towards the zeroth and first order maxima neighboring the first order minimum comprise a high information density on the respective position of the edge of the at least one reference object as compared to the total light amount. Depending on the upper limit up to which the low spatial frequencies are masked out and the aperture of the imaging, a second order minimum and a second order maximum may follow to the first order maximum, wherein both intensity increases towards to the first and second order maxima neighboring the second order minimum have a high information density on the respective position of the edge of the at least one reference object.

If the at least one reference object has dimensions of the wavelength of the illumination light or smaller, it practically only consists of edges and thus ensures a maximum information density on the respective position of the reference object as compared to the overall light amount. Actually, the at least one reference object may be a point shaped marker or a bead having a diameter below the wavelength of the light, wherein the edge detection filtered monochromatic image of the reference object in the reference object images shows two or more concentric intensity rings. The bead may be a fluorescent bead or the at least one reference object may be a fluorescent nanorod so that the light from the reference object is fluorescence light. So-called gold nanorods which are commercially available and which have diameters in a range from 50 nm to 150 nm, preferably of 75 nm or 100 nm and length in a range from 300 nm to 2,000 nm, preferably of 500 nm or 1,000 nm, are very well suited as non-fluorescent reference objects. Gold beads of these diameters may also be used as non-fluorescent reference objects.

If monochromatic light from the at least one reference object is imaged into the reference object images in the image plane, the light from the at least one reference object may, on base of its wavelength, be separated from measuring light from the sample that is imaged by means of the objective onto another detector than the camera. In other words, the detection of the movements of the sample with respect to the objective may be executed in parallel to the actual use of the objective imaging measuring light onto the other detector.

Actually, the sample may be wide-field illuminated with illumination light that induces an irradiation of the light from the at least one reference object connected to the sample.

If, for this purpose, the at least one reference object is illuminated through the objective, the illumination light may be focused into a center of the pupil of the objective, i.e. on the optical axis of the objective into the back focal plane of the objective, because this results into plane wavefronts of the illumination light in the object space. Generally, this focusing of the illumination light is associated with the occurrence of strong reflections of the illumination light at lens surfaces of the objective located close to the pupil, the reflections being directed towards the camera. However, these reflections of the illumination light are automatically masked out as they are also light originating from the central area of the pupil.

Alternatively, the illumination light may be focused off axis into the back focal plane of the objective to avoid strong reflections of the illumination light at lens surfaces of the objective located close to the pupil, which are directed towards the camera.

In any case, the objective may be a multi-lens objective having a lens surface essentially coinciding with the back focal plane on the optical axis of the objective.

As an alternatively to through the objective, the at least one reference object may be illuminated with illumination light that induces the irradiation of the light from the at least one reference object with the aid of a completely separate illumination device. A separate illumination device may have an illumination light source arranged laterally besides the objective, an illumination light source facing the objective across the sample, or an illumination light source located between the objective and the sample.

In an embodiment, which is disclosed here, even independently on the feature that the low spatial frequencies are masked out of the reference object images in front of the camera, the at least one reference object is illuminated with the illumination light that induces the irradiation of the light from the at least one reference object through a waveguide of the sample that is oriented transversely with respect to the optical axis of the objective. A glass plate or any other plate made of an optically transparent material of the sample may be used as the waveguide. This illumination is particularly effective, if the at least one reference object is located on a surface of the plate or in the plate. The plate may actually be an object slide or a cover slip of the sample. If the object slide or the cover slip has defects which act as scatter centers, these defects may serve as reference objects. If the illumination light is coherent light, a speckle pattern of the illumination light scattered by the at least one reference object or any other part of the sample may be recorded by the camera and observed for variations even without masking out parts of the light that originate from a central area of a pupil of the objective.

It is to be mentioned here that, even if no explicitly coherent monochromatic illumination light is used for illuminating the at least one reference object, an diffraction pattern appears in the reference object images if the at least one reference object has a sufficiently steep edge and particularly a diameter below the wavelength of the illumination light.

In any case, it is advantageous if the sample is illuminated with monochromatic illumination light of one wavelength to induce the light from the at least one reference object with just this wavelength. Here, in the context of the illumination light, the term "monochromatic" or "one wavelength" has always to be understood in that the bandwidth of the wavelength of the illumination light is so small that the described diffraction pattern occurs in a form usable for detecting movements of the sample with respect to the objective. The use of a low-price common laser, inclusive of a laser diode and a superluminescent diode, is sufficient for this purpose.

Preferably, the at least one reference object is illuminated with illumination light whose wavelength differs from wavelengths of measuring light from the sample and of excitation light that induces the measuring light from the sample by at least 50 nm or preferably at least 100 nm each. These wavelength differences of the illumination light and also of the light from the at least one reference object to both the measuring light from the sample and the excitation light that induces the measuring light do not only allow for a spectral separation of the light from the at least one reference object from the measuring light but also for an undisturbed coexistence of the measuring of the sample with the excitation light and the inducing of the light from the at least one reference object with the illumination light.

Additional further light in the reference object images from at least one optical boundary surface located between the sample and the object or from at least one further reference object which is located at the objective may be recorded with the camera. This further light includes further information on the relative position of the optical boundary surface with respect to the objective or the objective with respect to the camera, respectively, and thus on any additional drifts which are to be compensated. The edge detection filtering may also be carried out with regard to the further light.

The camera is preferably controlled such that the maximum light intensities in the reference object images reach 90% to 1.000% of a saturation intensity of the camera. Here, it is preferred, if the maximum light intensities reach 100 to 150% of this saturation intensity. In other words, the camera is controlled such that its dynamic range is completely utilized, wherein it is accepted that the maximum light intensities are above the saturation intensity of the camera and may thus no longer be resolved. This is based on the consideration that even in the edge detection filtered reference object images which are generated, the highest light intensities only include little information on the positions of interest of the images of the at least one reference object. It is more important to maximally resolve the intensity gradients at lower light intensities.

In the comparisons of the recorded reference object images, a lateral movement of the sample with respect to the objective orthogonal to an optical axis of the objective, i.e. in the x- and y-directions, may be gathered from a shift of the images of the at least one reference object between the reference object images. This shift may, for example, be determined by calculating correlations between the reference object images. On the other hand, movements of the sample with respect to the objective along the optical axis of the objective may be gathered from deformations of the images of the at least one reference object between the reference object images. Here, a movement of the sample with respect to the objective along the optical axis of the objective that is defined by amount and/or direction may be gathered from a similarity of images of the at least one reference object in the reference object images with images of the reference objects or other reference objects in reference object comparison images. Actually, at the beginning, a stack of reference object comparison images for different distances of the sample to the objective along the optical axis may be taken. Then conclusions may be drawn from the similarity of the image of the at least one reference object in one of the reference object images with the images of the reference object in the reference object comparison images on the distance belonging to the respective reference object image. This conclusion is simplified, if, with the aid of a cylinder lens arranged between the camera and the objective or with any other optical element, an astigmatism or any other imaging error is introduced in the imaging onto the camera which cancels the symmetry of the deformation of the images of the at least one reference object with increasing distance to a focal plane of the objective such that a direction of this distance is recognizable.

The at least one reference object can be generated in a glass plate or any other plate of the sample made of an optically transparent material by means of a focused light pulse. The fact that even a glass plate can be modified locally by means of a focused light beam, for example by evaporation, is generally known, see, for example, U.S. Pat. No. 9,370,956 B2. This fact may be utilized to arrange or generate the reference object at a particularly well-suited position of the sample. For this purpose, the light pulse may be focused by means of the objective into the respective plate of optically transparent material. The focused light pulse may be positioned with a scanner with respect to the plate, by which the sample is scanned with a localized light intensity distribution for generating the measurement light from the sample. This particularly refers to the scanner of a laser scanning microscope. A laser of such a laser scanning microscope by which the localized light intensity distribution is provided for generating the measurement light from the sample may also be used for providing the light pulse for generating the reference object in the sample, if, for example, the laser is suited for concentrating its laser power in particularly short-timed light pulses for this purpose. Both a cover slip and a sample slide of the sample may be considered as the plate of optically transparent material of the sample in which the reference object may be generated by means of a focused light pulse.

By repetitions of the light pulse it is also possible to generate a permanent pattern in the plate or another plate of optically transparent material of the sample, which codes an information in the sample. The coded information may, for example, record the kind, the extent and/or the points in time of measurements of the sample which already took place.

As already repeatedly mentioned, the detection of the movements of the sample with respect to the objective may be carried out during the actual use of the objective for measuring the sample. In practice, the reference object images may be recorded by the camera, while a structure of interest of the sample is imaged by confocal, STED, RESOLFT or MINFLUX microscopy. If, in doing so, any movements of the sample with respect to the objective are detected, they may be compensated for the microscopically imaging of the sample. This compensation may be effected by directly compensating the movements by opposite movements of the sample with respect to the objective, or by controlling an adaptive optic causing a virtual movement of the sample with respect to the objective, and also by a calculated correction of the microscopic image of the sample.

If the at least one reference object is in a reference object plane which is distinctly spaced apart from an object of interest of the sample in the direction of the optical axis of the objective, it is suitable to image the at least one reference object in the reference object images in the image plane by means of at least one lens in addition to the objective. This means that the reference object plane may be offset in direction of the optical axis of the objective with respect to an object plane within which the object of interest of the sample imaged by means of the objective is located. Worded more generally, it is preferred, if the focal length of the imaging optics is adjustable so that a reference object plane which is imaged into the image plane by the imaging optics may be shifted in direction of the optical axis of the objective with respect to an object plane which is imaged by the objective.

In an apparatus according for detecting the movements of the sample with respect to the objective, which comprises an objective and a camera that is arranged in an image plane of imaging optics that include the objective, an optical device is arranged between the objective and the camera in a plane that is Fourier-conjugated with respect to the image plane, the optical device being configured to mask out low spatial frequencies out of reference object images imaged into the image plane by the imaging optics.

The optical device arranged and configured in this way masks out parts of light which originate from a central area of a pupil of the objective in front of the camera.

Preferably, the device is arranged in such an image plane Fourier-conjugated with respect to the image plane into that the pupil of the objective is imaged.

Actually, the optical device may have a circular plate covering an area of the image plane around the axial image point and thus the central area of the pupil or a mirror deflecting the low spatial frequencies towards a further detector of the apparatus, or a spatial light modular (SLM) for masking out the low spatial frequencies. In the simplest case, the optical device is a wire extending through the axial image point or the center of the image of the pupil in the Fourier-conjugated plane.

A polarizing beam splitter via which an illumination light source couples illumination light towards the objective may be arranged between the Fourier-conjugated plane and the objective, wherein light that gets back into the objective after reflection of the illumination light at at least one reference object located in front of the objective is transmitted by the polarizing beam splitter towards the camera due to its polarization direction.

In order to only let pass such reflected light to the camera, that has maintained its circular polarization direction, a $\lambda/4$ waveplate may be arranged between the polarizing beam splitter and the objective. Due to the $\lambda/4$ waveplate between the polarizing beam splitter and the reference object, the light scattered by the reference object, when impinging on the polarizing beam splitter, predominantly has an orthogonal polarization as compared to the illumination light, which is separated by the polarizing beam splitter from the illumination light and which is then imaged onto the camera. On the other hand, possible reflections of the illumination light at surfaces of optical elements which are located between the polarizing beam splitter and the $\lambda/4$ waveplate, are deflected by the polarizing beam splitter in the direction of the illumination light beam.

The $\lambda/4$ waveplate may, however, also be omitted, if the polarizing beam splitter shall purposefully only transmit light from the at least one reference object towards the camera, which has changed its linear polarization direction in contrast to illumination light reflected at any optical boundary layer.

The apparatus may comprise a band pass filter between the objective and the camera, the band pass filter only letting pass light of one wavelength from the at least one reference object towards the camera.

An illumination light source of the apparatus for illuminating the at least one reference object may provide monochromatic illumination light, i.e. illumination light of one wavelength, wherein the wavelength, as a rule, is the same wavelength which the band pass filter located between the objective and the camera lets pass towards the camera.

Preferably, the illumination light in form of a linearly polarized collimated illumination beam is coupled-in via the polarizing beam splitter. Actually, the illumination light may have a wavelength in an infrared range from about 800 nm or preferably about 900 nm to 1,300 nm. If the illumination beam is focused into the pupil of the objective by a tube lens, the sample is illuminated by the illumination beam over a large area, i.e. wide-field illuminated. If, in doing so, the illumination light is focused into the center of the pupil of the objective to form plane wavefronts of the illumination light in the area of the sample, strong reflections of the illumination light towards the camera occur at lens surfaces close to the pupil, that are oriented perpendicularly to the optical axis, which strong reflections of the illumination light may affect the recording of the reference object images and which, even with a polarizing beam splitter and a λ/4 waveplate arranged between the polarizing beam splitter and the objective, may not be kept away from the camera. Even light of the beam or cone of the focused illumination light that runs towards the first lens surfaces at an angle with respect to the optical axis may impinge orthogonally or nearly orthogonally onto these lens surfaces so that it is reflected onto itself and thus also contributes to the reflection of the illumination light running towards the camera. However, all these reflections are also automatically masked out by the optical device which masks out the light from the central area of the pupil.

Preferably, the reference object is a marker at a surface of a cover slip of the sample.

As already indicated, a beam path of the apparatus extending between the objective and the camera preferably begins at the objective as an infinity beam path. Correspondingly, in actually measuring the sample, the objective also connects to an infinity beam path.

now referring in greater detail to the drawings, the apparatus 1 depicted in FIG. 1 serves for detecting movements of a sample 2 with respect to an objective 3. The sample 2 is arranged on a sample positioner 4 movable in x-, y- and z-directions, the z-direction coinciding with an optical axis 44 of the objective 3. The sample 2 includes an object slide 5, a cover slip 6 and an object of interest arranged in between. Primarily, this object is examined, i.e., for example, microscopically imaged or measured, with the aid of the objective 3, which, however, is not depicted in FIG. 1 in detail. This examination of the object of interest with the aid of the objective 3 takes place in parallel to the use of the apparatus 1 for detecting the movements of the sample 2 with respect to the objective 3 to detect and compensate a drift there between.

The apparatus 1 comprises an illumination light source 7 which provides a beam of illumination light 8 having one wavelength, i.e. of monochromatic illumination light 8. Via a polarizing beam splitter 9 and a tube lens 10 the illumination light 8 is coupled into the objective 3, actually in the center of an ocular-side pupil 19 of the objective 3 located on the optical axis 44 of the objective 3, and wide-field illuminates the sample 2. In case of the infinity beam path which is illustrated in all figures here and in which light coming from the sample 2 and getting through the ocular-side pupil 19 out of the objective 3 again is a parallel or infinity focus beam bundle, the ocular-side pupil 19 coincides with a back focal plane of the objective 3 so that the term ocular-side pupil is synonym for the back focal plane of the objective 3 here. However, even with an finite beam path having a finite focus point of the light getting out of the objective 3 of a microscope again, the ocular-side pupil may be so close to the back focal plane of the objective 3 that no relevant difference results with regard to the following explanation.

As depicted in FIG. 1, a λ/4 waveplate 11 may be arranged between the tube lens 10 and the objective 3, which at first right-hand circularly polarizes the at first s-linearly polarized illumination light 8. Corresponding light 43 scattered by reference objects in the sample 2 essentially remains right-hand circularly polarized, and after once again passing through the λ/4 waveplate 11 it is p-linearly polarized so that it is transmitted by the polarizing beam splitter 9 towards a camera 12. Light reflected at optical boundary surfaces between the polarizing beam splitter 9 and the λ/4 waveplate 11, however, has an s-linear polarization and is thus directed back to the illumination light source 7 by the polarizing beam splitter 9.

If the λ/4 waveplate 11 is omitted, all light reflected at optical boundary surfaces from the polarization beam splitter 9 up to and including the sample 2 still has an s-linear polarization and is directed back to the illumination light source 7 by the polarization beam splitter 9. Predominantly, this also applies for the light getting back from the reference objects into the objective 3. However, a certain proportion of the illumination light 8 scattered at the reference objects has a p-linear polarization and thus gets through the polarization beam splitter 9 to the camera 12. The absolute amount of this light 43 selectively from the reference objects getting to the camera 12 may be increased by increasing the intensity of the illumination light 8, if necessary.

The light 43 from the reference objects in the sample 2 is imaged by an ocular lens 13 and a further lens 14 into reference object images in an image plane 15. These reference object images in the image plane 15 are recorded by the camera 12. Further, a band pass filter 16 which only transmits light 43 of the wavelength of the illumination light towards the camera 12 is arranged between the polarizing beam splitter 9 and the camera 12. Further, an amplitude filter 18 is arranged there, in a plane 17 Fourier-conjugated with respect to the image plane 15, the amplitude filter 18 masking out parts of the light which originate from a central area of the pupil 19 of the objective 3 by means of a circular plate arranged in a central area of an image of the pupil 19 in the Fourier-conjugated plane 17. Thus, the amplitude filter 18 effects an edge detection filtering of the reference object images in the image plane 15, namely in front of the camera 12, so that the camera 12 already records the edge detection filtered reference object images in that it registers their light intensity distributions over the image plane 15.

As the reference objects are illuminated with monochromatic illumination light 8, first order minima to which first order maxima follow to strongly attenuated zeroth order maxima at steep edges of the reference objects in light intensity distributions of the reference object images. The intensity increases towards the zeroth and first order maxima neighboring the first order minima comprise a high information density about the positions of the edges of the reference objects as compared to the total light amount. If the reference objects have dimensions of the wavelength of the illumination light 8 or smaller, they actually only consist of edges and thus ensure a maximum information density with regard to the positions of the reference objects as compared to the total light amount.

Further, the circular disc 20, even then, when the λ/4 waveplate 11 according to FIG. 1 is present, has the effect that no parts of the illumination light 8 focused on the optical axis 44 into the ocular side pupil 19, which are reflected by optical boundary surfaces of the objective 3 close to the ocular side pupil 19 and oriented orthogonal to the optical axis 44 in the area of the optical axis 44, get to the camera 12 and disturb the recording of the edge filtered reference object images by the camera 12. Instead, the circular disc 20 arranged in the central area of the image of the pupil 19 also masks out these parts of the light coming from the central area of the pupil 19 of the objective 3.

With the apparatus 1, the reference images are recorded at consecutive points in time, and the reference object images are compared by a compensation device 21 to compensate movements of the sample 2 with respect to the objective 3, which become visible from changes of the reference object images, by controlling the sample positioner 4.

Figure 2:
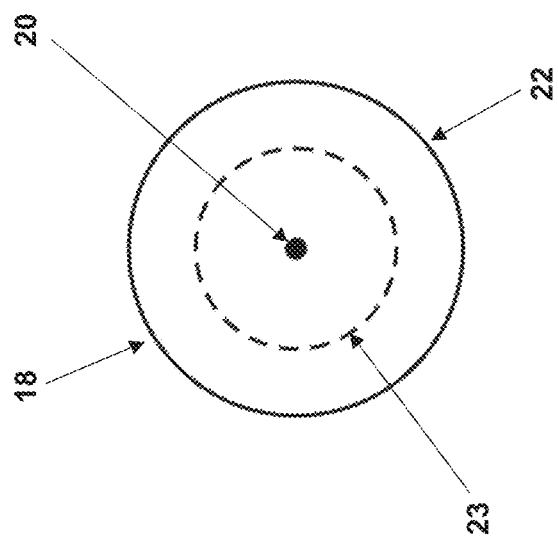
FIG. 2 shows a detail of the embodiment of the apparatus of FIG. 1.

FIG. 2 shows the amplitude filter 18 in an axial front view. The circular disc 20 is made as a metallic coating of a transparent substrate 22, and it is positioned in a center of an image 23 of the pupil of the objective in the Fourier-conjugated plane 17, in which the amplitude filter 18 is arranged. The Fourier-conjugated plane 17 is a Fourier-plane to the image plane 15 so that the circular disc 20 masks out low spatial frequencies out of the reference object images, whereas it lets pass higher spatial frequencies.

Figure 3:
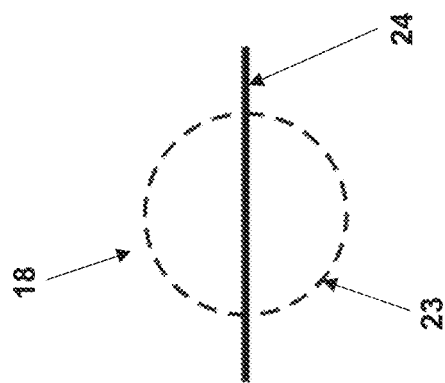
FIG. 3 shows a variant of the detail of FIG. 2.

In the embodiment of the amplitude filter 18 according to FIG. 3, the amplitude filter 18 is made as a wire 24 which extends linearly over the image 23 of the pupil 19 of the objective 3 and through its center in the Fourier-conjugated plane 17. The wire 24 also masks out higher spatial frequencies in the Fourier-plane but only at a low fraction, whereas, like the circular disc 20 according to FIG. 2, it completely masks out low spatial frequencies.

Figure 4:
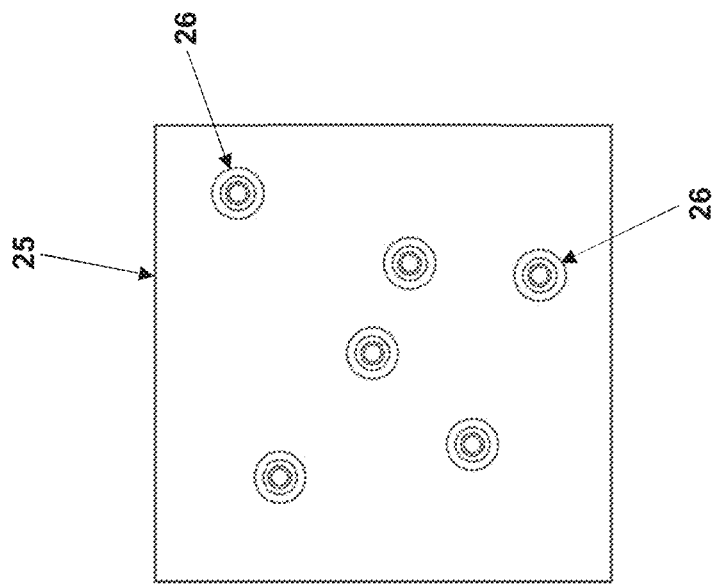
FIG. 4, in a simplified depiction, shows a reference object image that is edge detection filtered.

FIG. 4 shows a reference object image 5 resulting from the edge detection filtering, in which the images 26 of individual reference objects only consist of boundary areas, in which the intensity of the light from the reference objects increases. The essentially constant high intensities in the centers of the images 26 which are displayed in the image 27 of FIG. 5 that is complementary to the reference object image 25 of FIG. 4, and which do not contain usable information on the position of the images 26 in the reference object image 25, are masked out of the reference object image 25. Thus, they are also not registered by the camera 12 and do not affect the camera 12. Instead, the camera 12 is controlled such that it resolves the intensity increasing regions of the images 26 in the reference object image 25 of FIG. 4 to a maximum extent.

Figure 5:
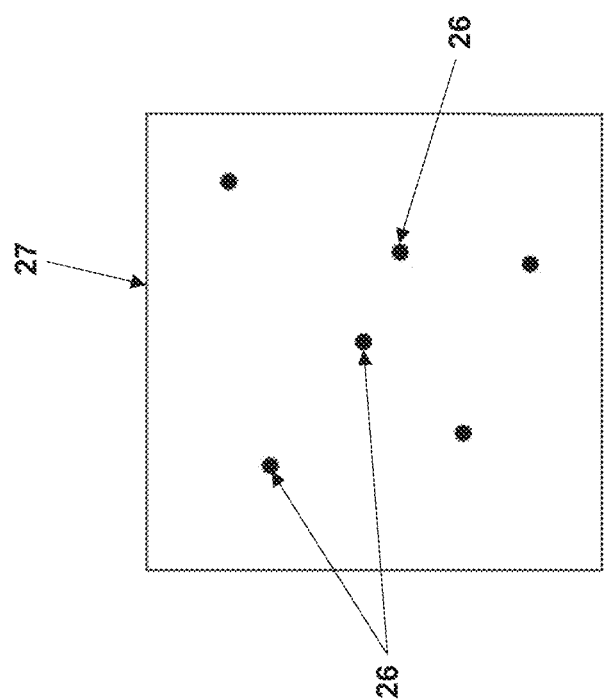
FIG. 5, in a simplified depiction, shows an image which is complementary to the reference object image of FIG. 4 and consists of the image parts that are filtered of the edge detection filtered reference object image.

A superposition of the reference object image 25 of FIG. 4 and the complementary image 27 of FIG. 5 would result in a common image of the reference objects. However, such a common image of the reference objects is not recorded by the camera 12 of the apparatus 1 and, correspondingly, also not divided up into the reference object image 25 of FIG. 4 and the complementary image 27 of FIG. 5 by means of image processing.

Figure 6:
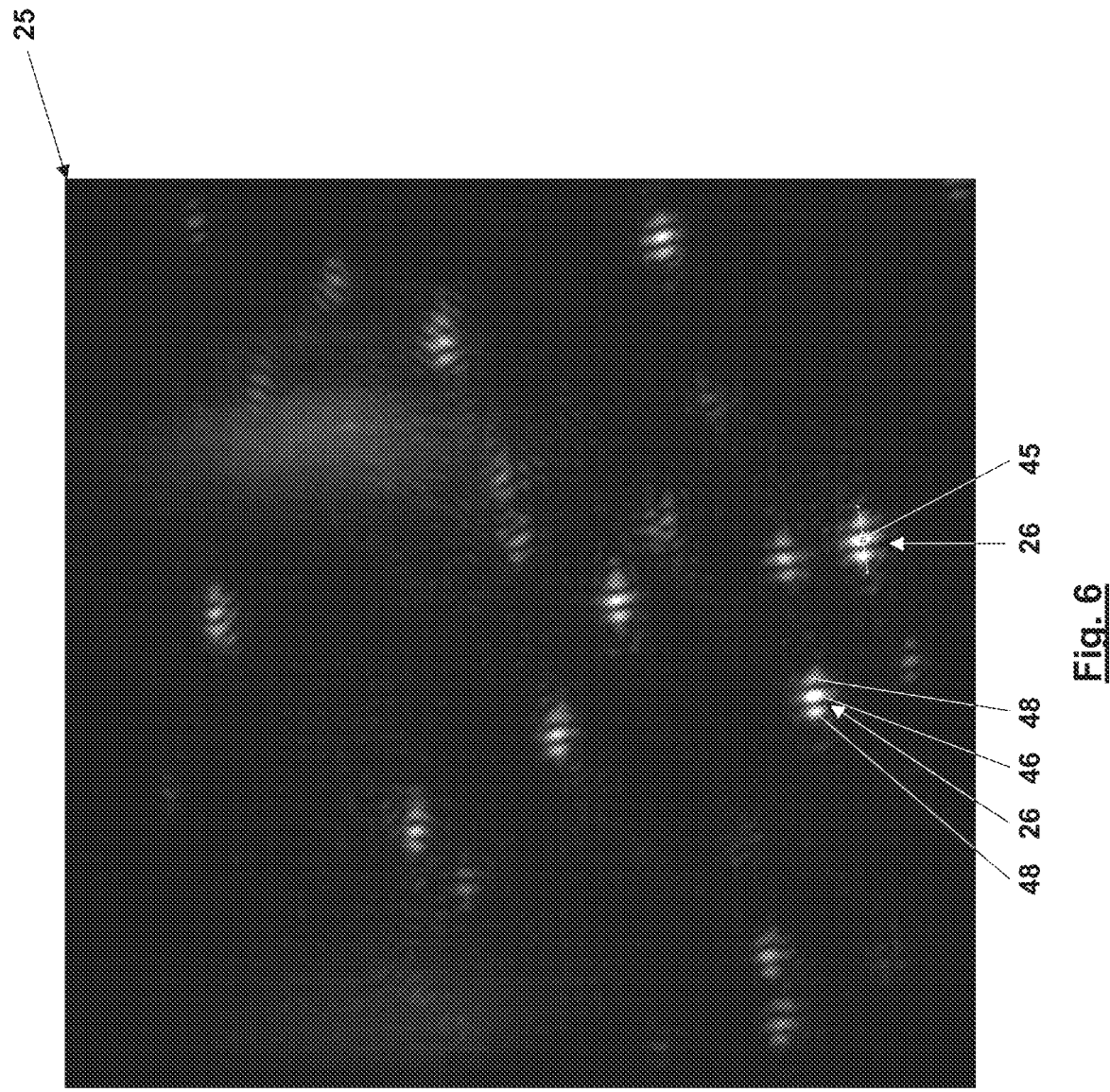
FIG. 6 shows a real edge detection filtered reference object image.

Whereas FIGS. 4 and 5 show simplified depictions of the reference object image 25 and the complementary image 27 of quasi point-shaped reference objects, FIG. 6 is a real edge detection filtered reference object image 25 of reference objects in form of so-called gold nanorods whose diameter is smaller than the wavelength of the light. In transverse direction to the longitudinal extension of the respective gold nanorod, the images 26 of the individual reference objects show diffraction patterns each comprising a zeroth order intensity maximum 46 and two neighboring first order intensity maxima 48.

Figure 7:
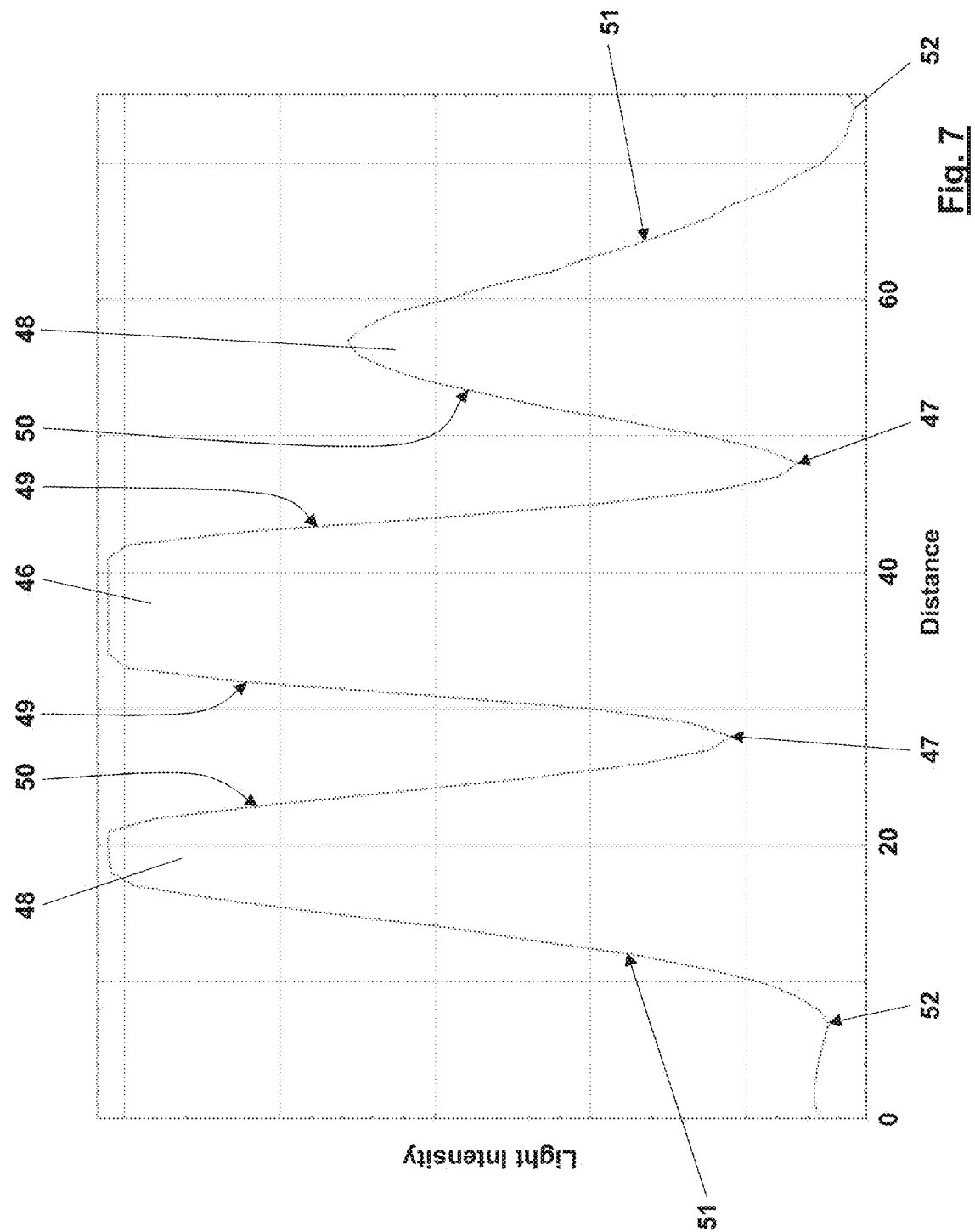
FIG. 7 is an intensity profile along a section line drawn in FIG. 6 and extending through an image of a reference object in the real reference object image.

The course of the light intensity along a section line 45 drawn in FIG. 6 through one of the images 26 of one of the reference objects is plotted in FIG. 7 over the distance in pixels of the camera 12 of FIG. 1. In the region of the zeroth order maximum 46, the light intensity recorded by the camera 12 is not only reduced to the level of the light intensity in the first order maxima 48 by the edge detection filtering, but also cut-off at a maximum value by the controlling of the camera 12. The latter also applies to the light intensity in the first order maximum 48 depicted on the left-hand side. First order minima 47 are located between the zeroth and first order intensity maxima 46 and 48. Intensity increasing regions 49 and 50 delimiting the first order intensity maxima 47 have a particular information density with regard to the position of the reference objects. Intensity increasing regions 51 from second order intensity maxima 52 towards the first order intensity maxima 48 also include usable position information.

Figure 8:
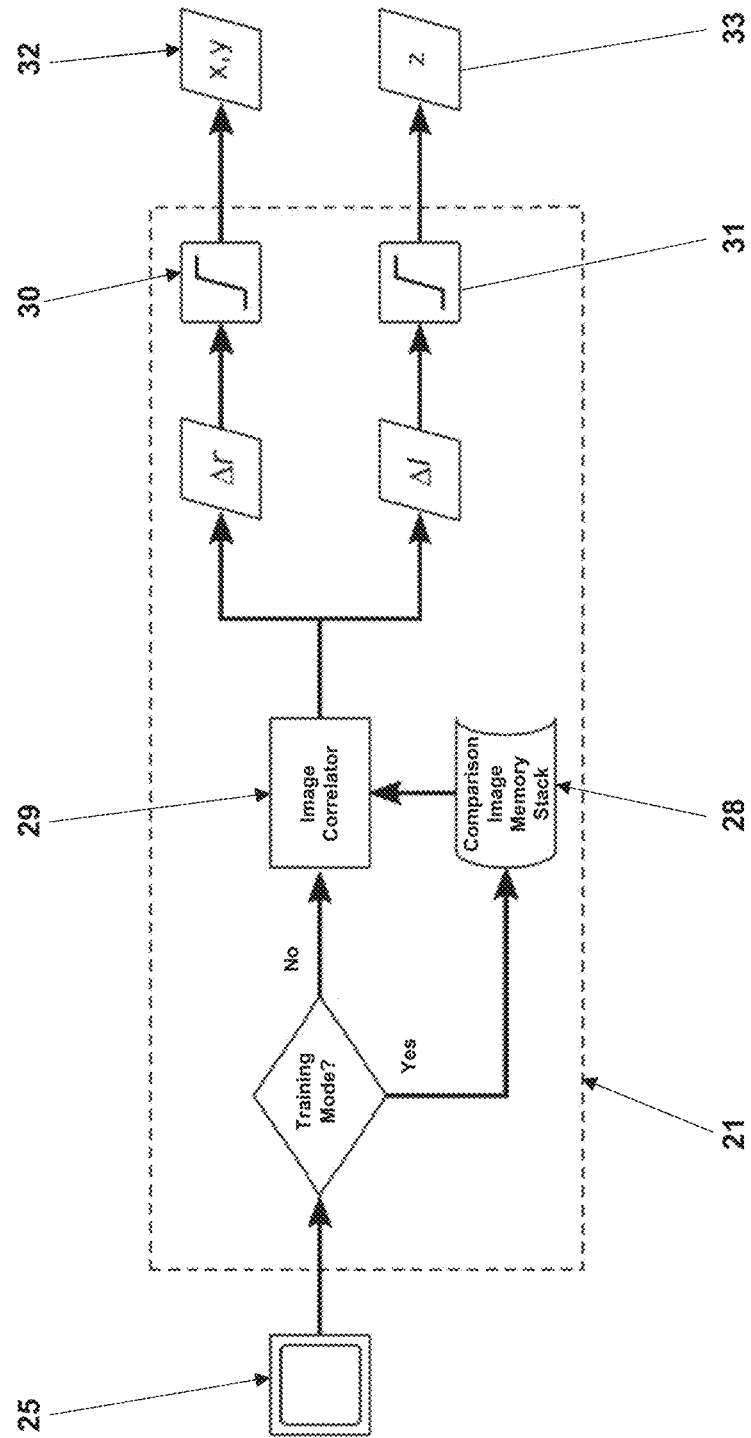
FIG. 8 illustrates a compensation device of the apparatus of FIG. 1.

FIG. 8 illustrates an embodiment of the compensation device 21 of FIG. 1. At first, in a training mode of the compensation device 21, a series of reference object images with different axial positions $z_i$ along the optical axis of the objective 3 are recorded and stored as reference object comparison images in a comparison image memory stack 28. Afterwards, the sample 2 is brought into its desired position by means of the sample positioner 4, and a compensation mode of the compensation device 21 is started. In this compensation mode, a control loop is cycled. In each cycle of the control loop, a reference object image 25 is recorded by the camera 12. Then, by means of an image correlator 29, a spatial cross correlation is calculated for the recorded reference object image and at least some of the reference object comparison images in the comparison image memory stack 28. A lateral position deviation $\Delta r$ in form of the position of a correlation maximum results from these calculations. This position of the correlation maximum corresponds to a shift of the images 26 of the reference objects in the present reference object image with respect to the position of the images 26 in one or more of the reference object comparison images in the comparison image memory stack 28. The lateral position deviation $\Delta r$ indicates the lateral drift of the sample 2 with respect to the optical axis 44 of the objective 3 since recording the reference object comparison images in the training mode. Further, the image correlator determines those reference object comparison images with which the present reference object image 25 has the highest image similarity, in which the images 26 of the reference objects are thus formed or deformed in a same way. From the axial positions $z_i$ of these most similar reference object comparison images, an axial position deviation $\Delta l$ is gathered, namely in that the present axial position of the sample 2 is set to be equal to the axial position $z_i$ of the reference object comparison image with the highest measure of similarity, or in that the present axial position of the sample 2 with respect to the objective 3 is extrapolated from the axial positions z of the reference object comparison images with the highest similarity measures. Setting signals 32 and 33 for compensating the lateral position deviation $\Delta r$ and axial position deviation $\Delta l$ in the sense of annulling these position deviations are formed by setting signal formers 30 and 31 considering the imaging scale of the imaging of the sample 2 onto the camera 12. After controlling the sample positioner 4 with these setting signals 32 and 33 the next cycle of the control loop takes place with recording of the next reference object image 25 by the camera 12.

For calculating the cross-correlations between the present reference object image 25 and the reference object comparison images in the comparison image memory stack 28, only a partial area of the reference object image and the reference object comparison images may be considered instead of considering the entire images in order to mask out possible disturbing signals. The recording of the reference object comparison images may, but does not need to, take place at equidistant axial positions. Instead, it is advantageous to select the axial distance of the reference object comparison images about the desired position of the sample 2 very small, and to increase it with increasing axial distance to the desired position. In this way, finely graduated reference object comparison images are present in the area of low axial drift so that small deviations may already be detected. At the same time, a high drift range can be covered without the need of a high number of reference object comparison images having to be recorded and processed in each cycle of the control loop for this purpose.

Further, besides the signals generated by the reference objects in form of the images 26 in the reference object images 25, it is possible to image a reflection from the objective 3 or a meniscus lens arranged in front of the pupil 19 of the objective 3 on the camera 12. Based on these reflections, any drift of the optical elements involved in imaging the reference objects in the reference object images 25 may be detected and corrected separately, i.e. independently of the drift of the sample 2 with respect to the objective 3.

Figure 9:
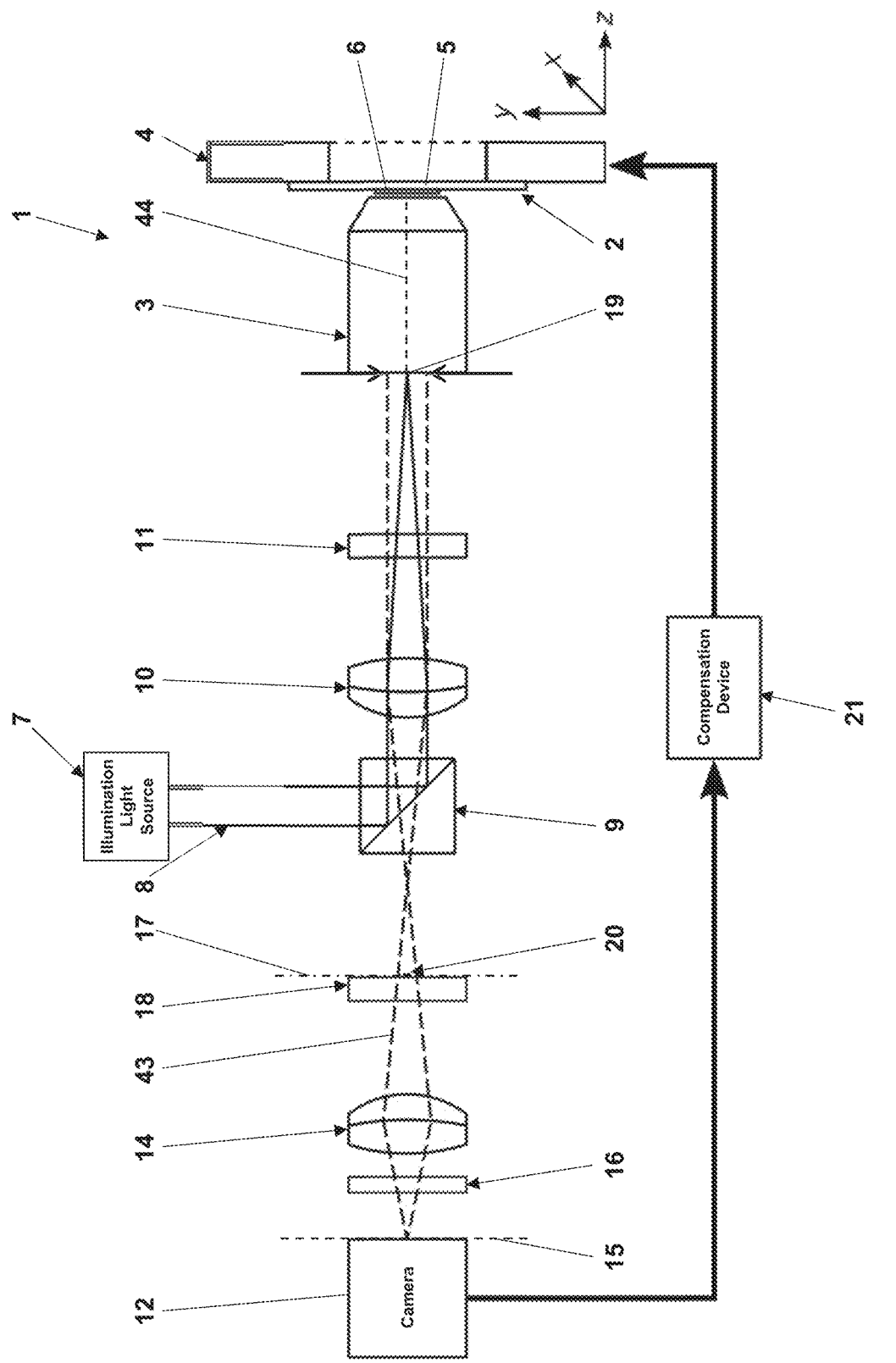
FIG. 9 shows a further embodiment of the apparatus for detecting movements of a sample with respect to an objective, also with incident illumination of the reference objects.

The embodiment of the apparatus 1 of FIG. 9 differs from that one of FIG. 1 by a slightly more compact construction, in which the amplitude filter 18 is also arranged in a plane 17 that is Fourier-conjugated with respect to the image plane 15, but not behind the ocular lens and thus not in a plane Fourier-conjugated with respect to the object plane into which the pupil 19 of the objective 3 is imaged. However, even here, the circular disc 20 in front of the camera 12 masks out the low spatial frequencies and also parts of the light out of the central area of the pupil 19 of the objective 3. The fact that no polarization directions of the illumination light 8 and the light from the reference objects are indicated in FIG. 9 does not mean that the same polarization directions as in FIG. 1 may not be present here. The arrangement of the band pass filter 16 at another position in the beam path does not alter its function as compared to FIG. 1.

Figure 10:
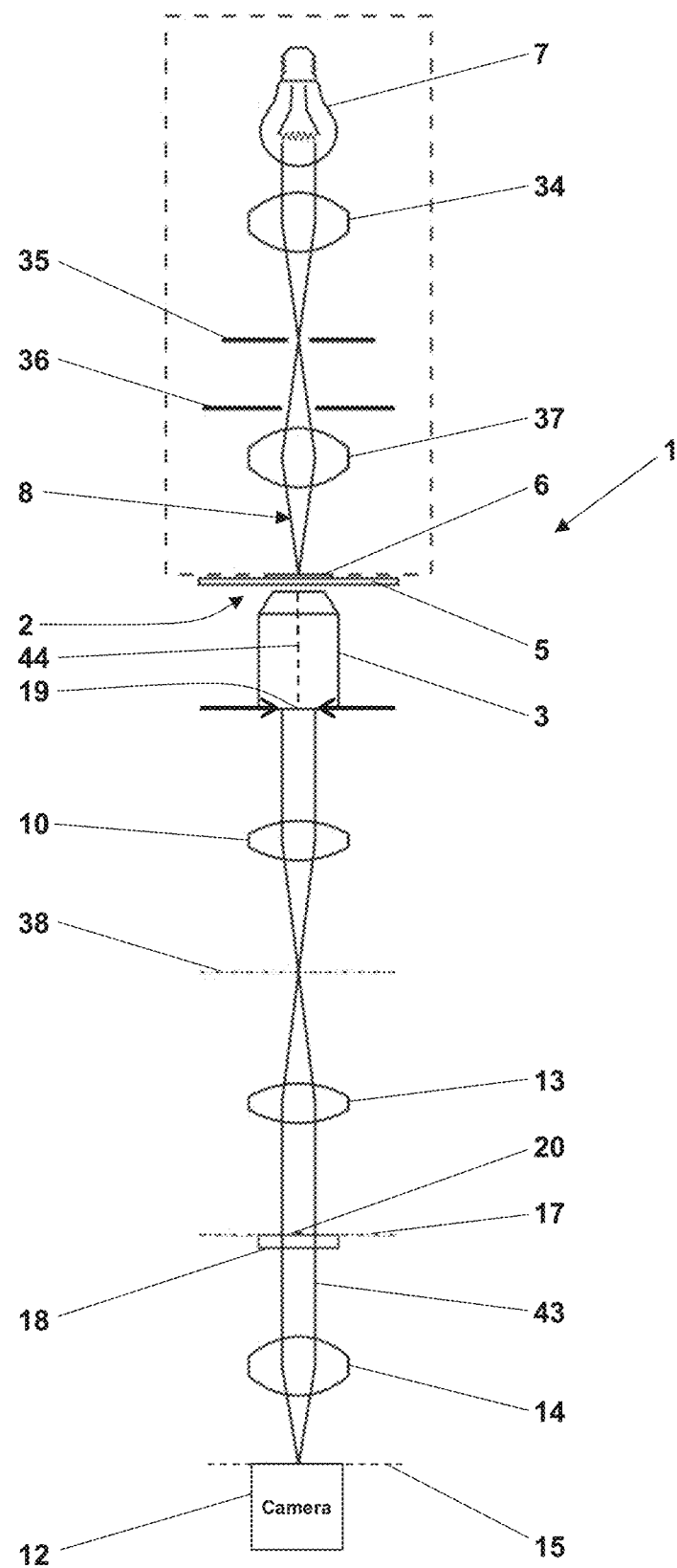
FIG. 10 shows an embodiment of the apparatus for detecting movements of a sample with respect to an objective with transmitted illumination of the reference objects.

In the embodiment of the apparatus 1 of FIG. 10, the illumination light 8 is not applied to the sample 2 through the objective 3 in an incident light configuration. Instead, the illumination light 8 is applied to the sample 2 in a transmitted light configuration from the illumination light source 7 through a collector lens 34, a light field stop 35, an aperture stop 36 and a condenser lens 37 from the backside as viewed from the objective 3. In the embodiment of the apparatus 1 of FIG. 10, the imaging of the reference objects in the sample 2 illuminated with the illumination light 8 onto the image plane 15 in which the camera 12 is arranged corresponds to that one in the embodiment of the apparatus 1 of FIG. 1. Here, an intermediate image plane 38 is additionally depicted, which is also present in FIG. 1 but not depicted there. Even if the illumination light source 7 in FIG. 10 is illustrated as a light bulb, the light 43 getting from the reference objects to the camera 12 may also only have one wavelength, i.e. be monochromatic in this embodiment of the apparatus 1.

Figure 11:
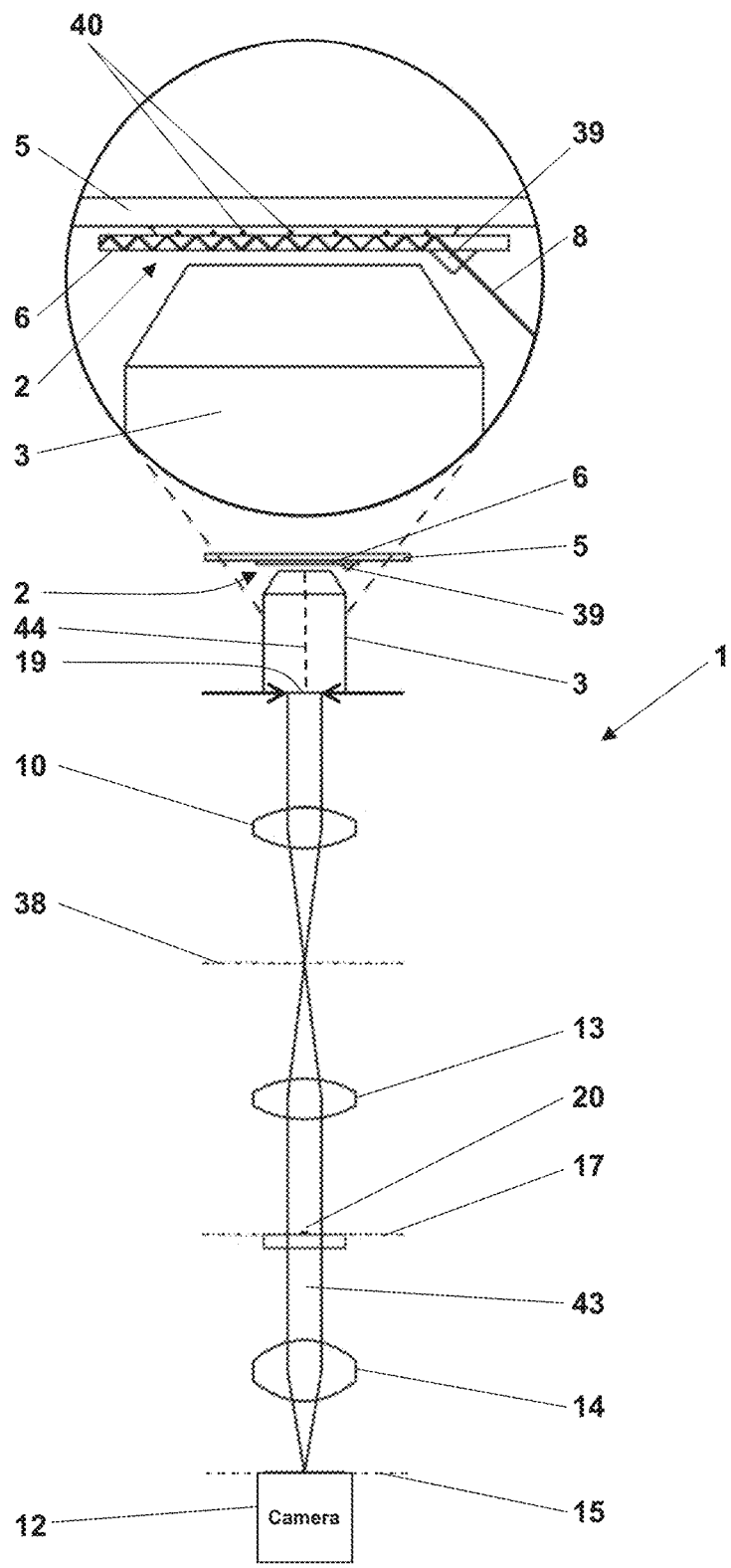
FIG. 11 shows an embodiment of the apparatus for detecting movements of a sample with respect to an objective with a lateral illumination of the reference objects.

FIG. 11 illustrates an embodiment of the apparatus 1 in which an even further possibility of illuminating the reference objects in the sample 2 is realized. This illumination is depicted in an enlarged detail. Via a prism 39, a beam of illumination light 8 is laterally coupled into the cover slip 6 which thus serves as a waveguide for the illumination light 8. The reference objects 40 in the sample 2 are illuminated by the illumination light 8 guided in the cover slip 6. The imaging of the light from the reference objects 40 onto the camera 12 corresponds to FIG. 1 and FIG. 10.

Figure 12:
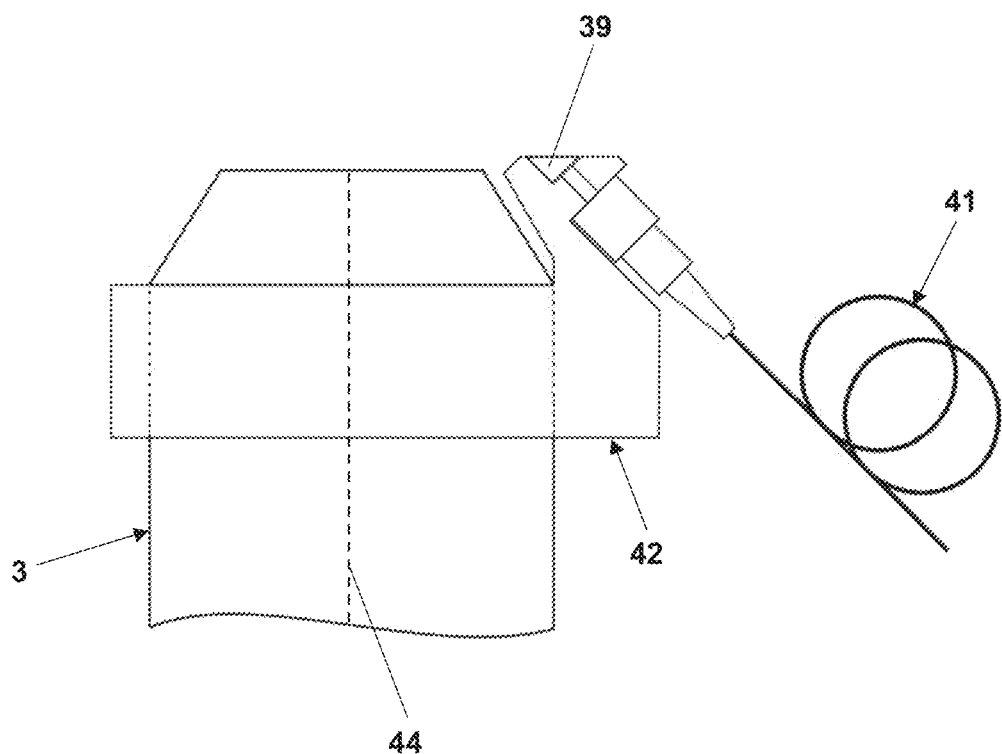
FIG. 12 shows a detail of a variation of the embodiment of the apparatus of FIG. 9.

FIG. 12 shows how a light guide 41 may be fixed by means of a holding device 42 to the objective 3 to couple the illumination light 8 into the prism 39 of FIG. 11 via this light guide 41.

Figure 13:
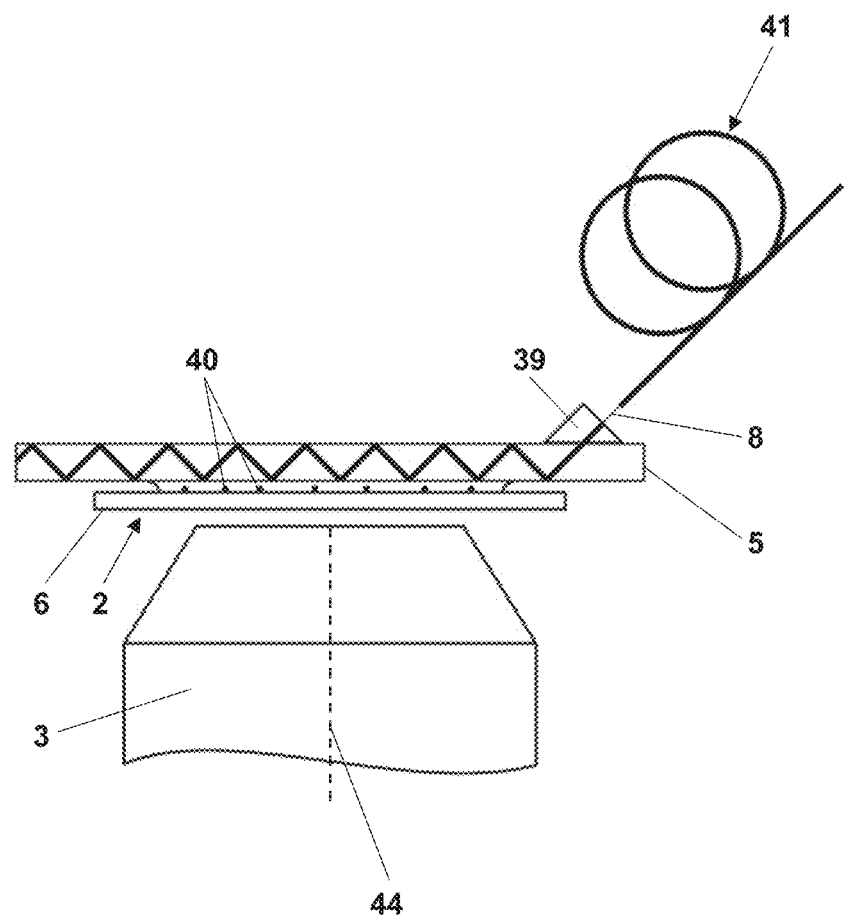
FIG. 13 shows a detail of another variation of the apparatus FIG. 9.

FIG. 13 illustrates an alternative embodiment of the lateral illumination in a depiction corresponding to the enlarged detail of FIG. 11. The light guide 41 couples the illumination light 8 into the prism 39, which is arranged on the sample slide 5 here, so that the sample slide 5 serves as a waveguide for the illumination light 8 to guide it to the reference objects 40 in the sample 2. The reference objects 40 may be markers formed in the sample 2 or in the cover slip 6 or the sample slide 5, respectively, by means of laser light. For this purpose, laser light may be applied highly concentrated in short pulses to the respective location of the sample 2, wherein the destruction limit of the respective glass is reached. In this way, the reference objects 40 may be formed in particularly suited positions of the respective sample.

The lateral illumination of the reference objects explained with reference to FIGS. 11 to 13 is disclosed here, even independently of the feature that parts of the light which originate from a central area of the pupil of the objective are masked out in front of the camera.

Many variations and modifications may be made to the preferred embodiments of the invention without departing substantially from the spirit and principles of the invention. All such modifications and variations are intended to be included herein within the scope of the present invention, as defined by the following claims.

We claim:

1. An apparatus for detecting movements of a sample with respect to an objective, the apparatus comprising
    imaging optics which
        include the objective,
        have an image plane and
        are configured to image light from at least one reference object that is connected to the sample arranged in front of the objective into reference object images in the image plane,
    a camera which is arranged in the image plane of the imaging optics and which is configured to record the reference object images at consecutive points in time, and
    an optical device arranged between the objective and the camera,
wherein the optical device is arranged in a plane that is Fourier-conjugated with respect to the image plane and wherein the optical device is configured to mask out low spatial frequencies of reference object images which the imaging optics image into the image plane, and wherein the illumination light source is configured and arranged to focus the illumination light on an optical axis of the objective into a back focal plane of the objective to wide-field illuminate the sample arranged in front of the objective with the illumination light.

2. The apparatus of claim 1, wherein the optical device is configured to mask out parts of light, which originate from a central area of a pupil of the objective, in front of the camera.

3. The apparatus of claim 2, wherein the imaging optics are configured to image the pupil of the objective into the plane that is Fourier-conjugated with respect to the image plane.

4. The apparatus of claim 2, wherein the optical device is selected from
 a circular disc,
 a mirror deflecting the low spatial frequencies to a further detector of the apparatus,
 a spatial light modulator (SLM) and
 a wire extending through a center of an image of the pupil of the objective in the plane that is Fourier-conjugated with respect to the image plane.

5. The apparatus of claim 1, comprising a band pass filter is arranged between the objective and the camera.

6. The apparatus of claim 1, comprising an illumination light source providing illumination light of one wavelength, wherein the illumination light source is configured and arranged for illuminating the reference objects that are connected to a sample arranged in front of the objective with the illumination light of the one wavelength.

7. The apparatus of claim 6, comprising an excitation light source providing excitation light that induces measuring light from the sample, wherein the one wavelength of the illumination light differs by at least 50 nm from wavelengths of the measuring light and of the excitation light.

8. The apparatus of claim 6, wherein the one wavelength is selected from an infrared range from 800 nm to 1.300 nm.

9. The apparatus of claim 1, wherein the objective is a multi-lens objective having a lens surface essentially coinciding with the back focal plane on the optical axis of the objective.

10. The apparatus of claim 1, comprising an illumination light source providing illumination light and a polarizing beam splitter which is arranged between the Fourier-conjugated plane and the objective, wherein the illumination light source is configured and arranged to couple-in the illumination light via the polarizing beam splitter, wherein the polarizing beam splitter is configured and arranged to transmit light that gets back into the objective after reflection of the illumination light at the at least one reference object that is connected to the sample arranged in front of the objective towards the camera due to its polarization direction.

11. The apparatus of claim 10, comprising a $\lambda/4$ waveplate arranged between the polarizing beam splitter and the objective.

12. The apparatus of claim 1, wherein a beam path between the objective and the camera starts at the objective as an infinity beam path.

13. The apparatus of claim 1, wherein the imaging optics comprise an optical element which introduces an imaging error that is configured to remove a symmetry of a deformation of images of the at least one reference object with increasing distance to a focal plane of the objective.

14. The apparatus of claim 1, wherein a focal length of the imaging optics is adjustable such that a reference object plane that is imaged by means of the imaging optics into the image plane is shiftable in the direction of an optical axis of the objective with respect to an object plane that is imaged by means of the objective.

15. The apparatus of claim 1, comprising a compensation device, wherein the compensation device is configured to compare the recorded reference object images to one another to gather any movements of the sample with respect to the objective.

16. The apparatus of claim 15, wherein the compensation device is configured to gather a lateral movement of the sample with respect to the object orthogonal to an optical axis of the objective from a shift of images of the at least one reference object between the recorded reference object images.

17. The apparatus of claim 15, wherein the compensation device is configured to gather a movement of the sample with respect to the objective along the optical axis of the objective from deformations of images of the at least one reference object between the recorded reference object images.

18. The apparatus of claim 15, wherein the compensation device is configured to gather a movement of the sample with respect to the objective along an optical axis of the objective from a similarity of images of the at least one reference object in the recorded reference object images with images of the reference objects or other reference objects in reference object comparison images.

19. The apparatus of claim 15, wherein the compensation device is configured to compensate any movements gathered by controlling a sample positioner for opposite movements of the sample with respect to the objective, or by controlling an adaptive optic causing a virtual movement of the sample with respect to the objective, or by calculating a correction for a microscopic image of the sample.

20. The apparatus of claim 1, wherein the imaging optics are configured to image further light from at least one optical boundary surface located between the sample and the objective or from at least one further reference object which is arranged at the objective into the reference object images in the image plane, and that the camera is configured to record the further light in the reference object images.

21. The apparatus of claim 1, wherein the imaging optics are configured to image the at least one reference object a reference object plane which is offset in the direction of the optical axis of the objective with respect to an object plane that is imaged by means of the objective.

22. An apparatus for detecting movements of a sample with respect to an objective, the apparatus comprising
 an illumination device providing illumination light and a waveguide oriented transversely with respect to an optical axis of the objective, the illumination device being configured and arranged to couple the illumination light into a waveguide,
 imaging optics which
  include the objective,
  have an image plane and
  are configured to image light from at least one reference object that is connected to the sample arranged in front of the objective into reference object images in the image plane,
 a camera which is arranged in the image plane of the imaging optics and which is configured to record the reference object images at consecutive points in time, and
 an optical device arranged between the objective and the camera,
wherein the optical device is arranged in a plane that is Fourier-conjugated with respect to the image plane and wherein the optical device is configured to mask out low spatial frequencies of reference object images which the imaging optics image into the image plane.

23. The apparatus of claim 22, wherein the waveguide is a plate of optically transparent material which serving as an object slide or coverslip of the sample.

24. The apparatus of claim 22, comprising a band pass filter is arranged between the objective and the camera.

25. The apparatus of claim 22, comprising an excitation light source providing excitation light that induces measuring light from the sample, wherein the one wavelength of the illumination light differs by at least 50 nm from wavelengths of the measuring light and of the excitation light.

26. The apparatus of claim 22, wherein the imaging optics comprise an optical element which introduces an imaging error that is configured to remove a symmetry of a deformation of images of the at least one reference object with increasing distance to a focal plane of the objective.

27. The apparatus of claim 22, wherein a focal length of the imaging optics is adjustable such that a reference object plane that is imaged by means of the imaging optics into the image plane is shiftable in the direction of an optical axis of the objective with respect to an object plane that is imaged by means of the objective.

28. The apparatus of claim 22, comprising a compensation device, wherein the compensation device is configured to compare the recorded reference object images to one another to gather any movements of the sample with respect to the objective.

29. The apparatus of claim 28, wherein the compensation device is configured to gather a lateral movement of the sample with respect to the object orthogonal to an optical axis of the objective from a shift of images of the at least one reference object between the recorded reference object images.

30. The apparatus of claim 28, wherein the compensation device is configured to gather a movement of the sample with respect to the objective along the optical axis of the objective from deformations of images of the at least one reference object between the recorded reference object images.

31. The apparatus of claim 28, wherein the compensation device is configured to gather a movement of the sample with respect to the objective along an optical axis of the objective from a similarity of images of the at least one reference object in the recorded reference object images with images of the reference objects or other reference objects in reference object comparison images.

32. The apparatus of claim 28, wherein the compensation device is configured to compensate any movements gathered by controlling a sample positioner for opposite movements of the sample with respect to the objective, or by controlling an adaptive optic causing a virtual movement of the sample with respect to the objective, or by calculating a correction for a microscopic image of the sample.

33. The apparatus of claim 22, wherein the imaging optics are configured to image further light from at least one optical boundary surface located between the sample and the objective or from at least one further reference object which is arranged at the objective into the reference object images in the image plane, and that the camera is configured to record the further light in the reference object images.

34. The apparatus of claim 22, wherein the imaging optics are configured to image the at least one reference object a reference object plane which is offset in the direction of the optical axis of the objective with respect to an object plane that is imaged by means of the objective.

35. A method of detecting movements of a sample with respect to an objective, the method comprising
   imaging light from at least one reference object connected to the sample at consecutive points in time by means of the objective into reference object images in an image plane,
   selecting the at least one reference object such that it has an edge,
   in a plane that is Fourier-conjugated with respect to the image plane, masking out low spatial frequencies out of the reference object images in front of the camera in such a way that a diffraction pattern is formed at the edge in the reference object images, the diffraction pattern comprising a zero order intensity maximum which is reduced in its intensity due to the masked out low spatial frequencies, a first order intensity minimum and a first order intensity maximum following to the first order intensity minimum with intensity increasing regions neighboring the first order intensity minimum towards to the zeroth and first order intensity maxima,
   recording the reference object images in the image plane by a camera, and
   comparing the recorded reference object images to one another.

36. The method of claim 35 comprising selecting the at least one reference object such that the intensity of the light from the reference object drops across the edge by at least 90%, and a width of the edge in parallel to the image plane is smaller than the wavelength of the light.

37. The method of claim 36, comprising selecting the at least one reference object from a group consisting of a point-shaped marker, a bead and a nanorod having a diameter below the wavelength of the light.

38. The method of claim 35, wherein the step of comparing comprises gathering any movements of the sample with respect to the objective.

39. The method of claim 35, wherein the step of comparing comprises gathering a lateral movement of the sample with respect to the object orthogonal to an optical axis of the objective from a shift of images of the at least one reference object between the recorded reference object images.

40. The method of claim 35, wherein the step of comparing comprises gathering a movement of the sample with respect to the objective along the optical axis of the objective from deformations of images of the at least one reference object between the recorded reference object images.

41. The method of claim 38, further comprising compensating any movements of the sample with respect to the objective gathered by at least one of
   controlling a sample positioner for opposite movements of the sample with respect to the objective,
   controlling an adaptive optic causing a virtual movement of the sample with respect to the objective, and
   calculating a correction for a microscopic image of the sample.

42. An apparatus for detecting movements of a sample with respect to an objective, the apparatus comprising
   imaging optics which
      include the objective,
      have an image plane and
      are configured to image light from at least one reference object that is connected to the sample arranged in front of the objective into reference object images in the image plane,
   a camera which is arranged in the image plane of the imaging optics and which is configured to record the reference object images at consecutive points in time,
   an optical device arranged between the objective and the camera, wherein the optical device is arranged in a plane that is Fourier-conjugated with respect to the image plane and wherein the optical device is configured to mask out low spatial frequencies of reference object images which the imaging optics image into the image plane, and
   a compensation device, wherein the compensation device is configured to compare the recorded reference object images to one another to gather any movements of the sample with respect to the objective.

43. A microscope comprising the apparatus of claim 42, wherein the microscope is a confocal microscope, a stimulated emission depletion (STED) microscope, a reversible saturable optical linear (Fluorescence) transitions (RESOLFT) microscope or a minimalemission fluxes (MINFLUX) microscope, and wherein the compensation device is configured to gather and compensate any movements of the sample with respect to the objective during operation of the microscope.

44. The apparatus of claim 42, wherein the compensation device is configured to gather a lateral movement of the sample with respect to the object orthogonal to an optical axis of the objective from a shift of images of the at least one reference object between the recorded reference object images.

45. The apparatus of claim 42, wherein the compensation device is configured to gather a movement of the sample with respect to the objective along the optical axis of the objective from deformations of images of the at least one reference object between the recorded reference object images.

46. The apparatus of claim 42, wherein the compensation device is configured to gather a movement of the sample with respect to the objective along an optical axis of the objective from a similarity of images of the at least one reference object in the recorded reference object images with images of the reference objects or other reference objects in reference object comparison images.

47. The apparatus of claim 42, wherein the compensation device is configured to compensate any movements gathered by controlling a sample positioner for opposite movements of the sample with respect to the objective, or by controlling an adaptive optic causing a virtual movement of the sample with respect to the objective, or by calculating a correction for a microscopic image of the sample.

48. The apparatus of claim 42, wherein the imaging optics are configured to image further light from at least one optical boundary surface located between the sample and the objective or from at least one further reference object which is arranged at the objective into the reference object images in the image plane, and that the camera is configured to record the further light in the reference object images.

49. The apparatus of claim 42, wherein the imaging optics are configured to image the at least one reference object a reference object plane which is offset in the direction of the optical axis of the objective with respect to an object plane that is imaged by means of the objective.

50. The apparatus of claim 42, comprising a band pass filter is arranged between the objective and the camera.

51. The apparatus of claim 42, comprising
an illumination light source providing illumination light of one wavelength, wherein the illumination light source is configured and arranged for illuminating the reference objects that are connected to a sample arranged in front of the objective with the illumination light of the one wavelength, and
an excitation light source providing excitation light that induces measuring light from the sample, wherein the one wavelength of the illumination light differs by at least 50 nm from wavelengths of the measuring light and of the excitation light.

52. The apparatus of claim 42, wherein the imaging optics comprise an optical element which introduces an imaging error that is configured to remove a symmetry of a deformation of images of the at least one reference object with increasing distance to a focal plane of the objective.

53. The apparatus of claim 42, wherein a focal length of the imaging optics is adjustable such that a reference object plane that is imaged by means of the imaging optics into the image plane is shiftable in the direction of an optical axis of the objective with respect to an object plane that is imaged by means of the object.

* * * * *